Patented Jan. 31, 1939

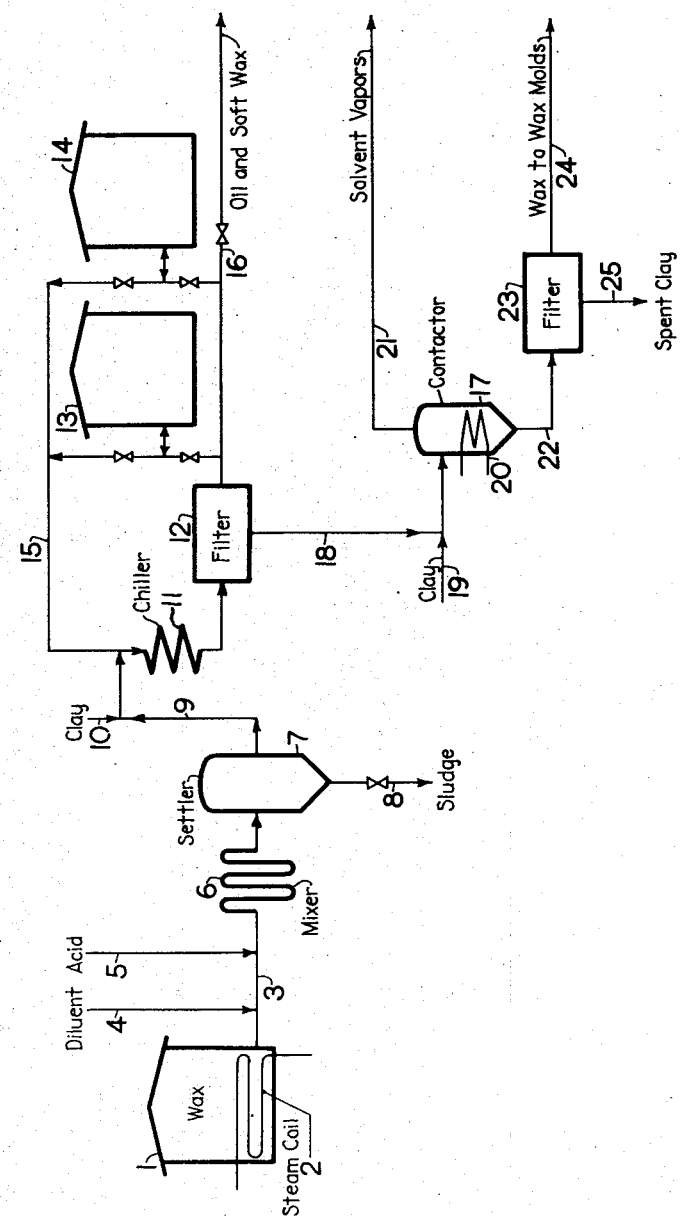

2,145,784

UNITED STATES PATENT OFFICE 2,145,784

REFINING WAX

Alvin P. Anderson, Alton, and Edward J. Jahn, Wood River, Ill., assignors to Shell Development Company, San Francisco, Calif., a corporation of Delaware Application March 4, 1936, Serial No. 67,113

10 Claims. (Cl. 196—18)

This invention relates to the preparation of marketable paraffin wax from raw bulk wax and similar wax mixtures, and is particularly concerned with an improved method for separating hard waxes of light color from dark colored wax mixtures, which mixtures may often contain hydrocarbons which are liquid at ordinary temperatures.

Paraffin wax is most commonly obtained from petroleum oils, particularly from reduced crudes or wax distillates, by freezing them and separating the solidified wax from the liquid components by some physical method, such as filtration or centrifuging. In some instances, the separation of the wax is effected in the presence of a hydrocarbon diluent, such as propane, or naphtha, or in the presence of a diluent exercising selective solvent properties between the wax and the oil, such as a mixture of benzene and acetone. In certain other processes, the oil is treated with a mineral acid, such as sulfuric acid, under conditions causing the formation of pepper sludge, and the wax is solidified while the pepper sludge is maintained in suspension, to form nuclei for the wax.

Waxes obtained by any of these or other similar methods are herein referred to as raw bulk waxes. They are solid or semi-solid at normal temperatures (from 40° F. to 90° F.) and, generally contain a considerable quantity of dark-colored material, and contain a variety of hydrocarbons having different melting points. Since, as a general rule, the melting point of a mixture of substances is below the arithmetic mean of the melting points of the components of the mixture, it follows that such bulk waxes contain individual waxes having melting points which are considerably higher than the melting point of the bulk wax.

For many purposes water white or very light colored waxes are required; moreover, only the high-melting waxes are well suited for many particular applications, and these hard waxes are more valuable than the low-melting waxes. There are several methods known to the art for accomplishing the decolorization and isolation of individual waxes. Decolorization has heretofore been effected by treatment with clays, or by sulfuric acid treatment, followed, if desired, by clay treatment. For the separation of the components of the bulk wax, sweating, fractional distillation, extraction, etc., have been proposed.

Among the known processes for the separation of waxes, distillation is unsuited for the production of light colored, hard waxes, because after distillation, the bottoms, containing the hard waxes, still contain oil, and their melting points are, therefore, relatively low. Moreover, the coloring matter is concentrated in the bottoms and a severe treatment is required to produce a satisfactory light colored product, in addition to the sweating treatment, which is necessary to raise the melting point of the wax.

Sweating, without preliminary distillation, could be employed for treating bulk waxes which already have good colors, the softer waxes being successively removed. This process is, however, difficult to handle, and the yield and melting point of hard waxes are low.

In attempting to produce light-colored, hard waxes from dark colored bulk waxes, such as black Mid-Continent bulk wax, we found it to be impractical to employ an acid treatment followed by sweating, because upon being treated with acid, the raw waxes form oil-soluble acidic compounds, and these compounds make the usual finishing treatments uneconomical because of large amounts of clay required to obtain light-colored products.

It is an object of the present invention to provide an improved process for producing light colored, hard waxes in a combination of steps which improves the yield of hard waxes.

Briefly, our process consists in treating a normally solid dark-colored raw wax in a molten state with concentrated sulfuric acid in the presence of a light hydrocarbon diluent, such as propane, petroleum naphtha, or any other similar diluent, to form an acid sludge, separating the sludge by settling, centrifuging, or any other physical method, and chilling the sour wax, preferably at a rate to insure the formation of filterable crystals, by indirect cooling or by partial evaporation of the diluent present in solution at a low pressure, and separating the solidified wax from the liquid wax-diluent solution by any method, such as filtration. The chilling is stopped at one or more stages, and the individual wax fractions, crystallized in the stepwise chilling, are collected separately. The separated wax fractions may, if desired, be further finished with a clay treatment. The quantity of the diluent depends upon the viscosity of the wax. In most cases, between 100% and 800% of diluent are suitable. The amount of acid used depends upon the wax being treated. For most purposes between 10 and 30% by volume of any strong concentrated mineral acid, such as between 90% and 100% $H_2SO_4$ is suitable, although our process is not restricted to these limits.

It was found that by fractionally precipitating the wax in this manner the fractionation efficiency was greatly increased, and that the melting points of the fractions, as well as their yields, were increased, as compared with the former methods involving sweating, or fractional precipitation from a neutral medium. The wax should preferably have an acid content of above 0.2, expressed in mg. KOH per g.

We have, further, found that the yield of hard wax can be greatly improved by adding a finely subdivided material, such as pulverized clay, to the liquid preferably acid, diluted wax before chilling, and the mixture is agitated to maintain the pulverized material in suspension during the chilling. The fine particles probably form nuclei for the crystallization of the higher-melting wax, and enhance the fractionation efficiency of the process. This material may be added to the filtrate from each filtration stage, before the succeeding chilling step. This feature is particularly useful when combined with the above described method of fractionating acid-treated wax, the pulverized material being added to the wax after the removal of the acid sludge. While we prefer to employ about 2% by weight of pulverized, activated clay, other materials, such as activated silica, bentonite, etc., may be employed. The quantity may also be varied within wide limits, although we prefer to employ between .5 and 5%.

The pulverized material may be conveniently maintained in suspension by bubbling small amounts of gaseous propane through the solution during the chilling period. The first filtration is made at a temperature depending upon the yield and melting point desired. The fraction obtained may be passed into a heating tank supplied with a mechanical stirring device, where the clay-wax propane fraction is heated and stirred to remove propane and to contact the wax with the clay present in the fraction. The finished product is obtained after removal of the clay by filtration. The contacting may be effected in a separate vessel, and in a separate operation. A processing step and heat may, however, be saved by filtering the molten wax directly after the vaporization of the solvent, such as propane, or after further heating in the same vessel.

Our invention may be further illustrated by the following examples, which are, however, given merely by way of elucidation, and not with a view of limiting the scope of the present invention:

Example I

A hard, black Mid-Continent bottom wax having a melting point of 134° F. obtained from the raw bulk wax upon removing 40% by vacuum distillation was mixed with 400% by volume of liquid propane and 15% by weight of 93% sulfuric acid; the mixture was heated to 140°–145° F. and well mixed to dissolve the wax, and the heated mixture was allowed to stand to effect separation of the acid sludge.

One portion of the desludged wax was neutralized with 30° Bé. caustic soda solution and washed, and another portion was left unneutralized. These portions were separately chilled by evaporating a portion of the propane, and filtered at the following temperatures: 80° F., 70° F., 60° F., and 30° F. The wax fractions obtained were then warmed and contacted with 10% of activated clay (Filtrol). The results were as follows:

Table I

|  | Percent by weight yield | NPA color | ASTM melting point |
|---|---|---|---|
|  |  |  | °F. |
| Original sample | 100 | Black | 134 |
| Neutralized wax filtered at— |  |  |  |
| 80° F | 2.0 | Black | (a) |
| 70° F | 1.5 | Black | (a) |
| 60° F | 28.0 | 5+ | 111 |
| 30° F | 18.5 | 6 | 134 |
| Sour wax filtered at— |  |  |  |
| 80° F | 14.0 | 5+ | 150 |
| 70° F | 5.5 | 4½+ | 142 |
| 60° F | Trace |  |  |
| 30° F | 10.0 | 5+ | 135 |

(a) Undeterminable due to soap.

The above results indicate that the precipitation of wax from an acid wax solution is far more advantageous than the precipitation from a neutralized wax solution containing oil-soluble soaps.

Example II

In order to determine whether or not the soapy matter obtained in the neutralization was the cause of the faulty wax crystallization obtained in the above example, another portion of the acid treated and desludged wax was neutralized, the propane removed, and the treated wax was clay treated to remove the soap. The resulting wax was then again dissolved in liquid propane, and fractionated by step-wise chilling, and filtration at the following temperatures: 80° F., 60° F., and 40° F., and the wax fractions were contacted with 10% of activated clay. The results are shown in the following table:

Table II

|  | Percent by weight yield | NPA color | ASTM melting point |
|---|---|---|---|
|  |  |  | °F. |
| Filtered at— |  |  |  |
| 80° F | 18.6 | 3+ | 144 |
| 60° F | 18.2 | D3½+ | 133 |
| 40° F | 10.8 | D3+ | 129 |

By comparing the above results with those given in Table I, it will be noted that the absence of the soapy matter results in relatively larger yields; but the fractionation efficiency is low, as is apparent from the lower melting point of the precipitated wax.

Example III

Sour acid treated and desludged wax, as described in Example I, was chilled in several stages in the presence of 2% of activated pulverized clay being added before each chilling step. The wax fractions were warmed to cause effective contact with the clay contained in the wax, no further quantities of clay being added. The results were as follows:

Table III

|  | Percent by weight yield | NPA color | ASTM melting point |
|---|---|---|---|
| Filtered at— |  |  | °F. |
| 80° F | 13.5 | 5+ | 161 |
| 70° F | 6.0 | 3+ | 156 |
| 60° F | 5.5 | 3+ | 148 |
| 30° F | 34.0 | 4½+ | 125 |

It will be noted that the addition of the pulverized clay has a marked effect upon the fractionation efficiency, and resulted in a decided improvement of the melting points of the first three wax fractions.

Example IV

To show the applicability of our invention to raw bulk wax, as distinguished from the bottoms wax employed in the preceeding examples, a black Mid-Continent soft bulk wax, from which hard waxes could not be obtained by ordinary methods unless the yields were kept very low by employing usually high filtration temperatures, was treated with 15% by weight of 93% sulfuric acid in the presence of 400% liquid propane at 140–145° F., and desludged by settling. One portion was chilled and filtered without the addition of clay, and the resulting wax fractions contacted with 10% clay, and another portion was similarly filtered, but in the presence of 2% finely divided clay, the clay being added before each chilling step, and the wax fractions were recovered to contact the wax with the clay contained therein, without the further addition of clay. The results are shown in Table IV:

Table IV

|  | Percent by weight yield | NPA color | ASTM melting point | Percent clay in wax fraction |
|---|---|---|---|---|
| Original sample | 100 | Black | °F. 132 |  |
| Wax filtered without clay at— |  |  |  |  |
| 90° F | 4.6 | 3½+ | 118 |  |
| 75° F | 20.0 | 3+ | 135 |  |
| 60° F | 7.7 | 3+ | 132 |  |
| Wax filtered with 2% clay at— |  |  |  |  |
| 90° F | 10.5 | 3½+ | 160 | 18 |
| 75° F | 12.0 | 3½ | 145 | 20 |
| 60° F | 9.5 | 3+ | 139 | 16 |

Example V

To show that the clay improves the fractionation efficiency even in the case where the wax has not been acid treated, raw bulk wax described in Example IV, was heated in the presence of 5% asphalt and 600% by volume of liquid propane to 155–160° F., and the asphalt layer removed. One portion was chilled and filtered in the absence of clay, and the resulting wax fractions contacted with 10% of clay; and another portion was chilled and filtered in the presence of 2% finely divided clay, added before each step of chilling, and the resulting wax fractions were warmed to contact the wax with the clay, without the further addition of clay. The results are shown in Table V.:

Table V

|  | Percent by weight yield | NPA color | ASTM melting point | Percent clay in wax fraction |
|---|---|---|---|---|
| Original sample | 100 | Black | °F. 132 |  |
| Wax filtered without clay at— |  |  |  |  |
| 90° F | 7.5 | N. T. (a) | 145 |  |
| 75° F | 7.0 | 8 | 135 |  |
| 60° F | 5.6 | 8+ | 125 |  |
| Wax filtered with 2% clay at— |  |  |  |  |
| 90° F | 10.0 | D6+ | 155 | 20 |
| 75° F | 10.5 | N. T. (a) | 146 | 7 |
| 60° F | 6.0 | 4+ | 144 | 24 |

(a) Not transparent.

A comparison of the results obtained in Examples IV and V shows the marked improvement in fractionation efficiency, and a marked improvement in the yield and melting point of hard waxes due to preliminary acid treatment, and fractional precipitation from the acid medium. Moreover, the results in Table V show that the precipitation in the presence of finely divided clay is useful although the wax has not been acid treated.

Referring to the drawing representing a flow diagram of a semi-continuous version of our process: Wax is melted in tank 1 by steam in coil 2. The molten wax is diluted in line 3 with a suitable solvent from line 4 and the resulting wax solution having a temperature sufficiently high to prevent precipitation of wax is mixed with acid from line 5 in mixer 6. The mixture so obtained enters settling tank 7 where acid sludge is settled out and is withdrawn through line 8. The supernatant acid-reacting wax solution, substantially free from sludge but having an acidity above 0.2 milligrams KOH per gram of solution, may now be withdrawn through line 9 and mixed with clay which is introduced through line 10 either in the form of a dry powder or as a slurry in a suitable carrier liquid such as low-boiling hydrocarbon liquid. If desired, the addition of clay can be omitted. The solution which preferably contains clay is now chilled in chiller 11 to a predetermined desired low temperature. Wax which precipitates, together with suspended clay, if clay is present, is retained in filter 12, which filter is advantageously of a continuous type. The filtrate proceeds to one of the tanks 13 or 14, to be recirculated when the supply of the original wax from tank 1 is shut off, through line 15, chiller 11, filter 12, into the other of the two tanks 13 or 14. The chilling temperature is lower than the first time and a fresh amount of clay is advantageously added to the recirculating solution. The recirculation may be repeated a number of times at consecutively lower temperatures until substantially all of the wax in the solution has been fractionally precipitated and filtered out.

The final filtrate is discarded through line 16.

The several batches of wax from filter 12 are introduced into contactor 17 through line 18. If the wax contains no clay, clay may be added through line 19. Heat for the contacting is provided in any conventional manner as by means of a heating coil 20. Solvent vapors escape through line 21 while the contacted wax is withdrawn through line 22 to be filtered in filter 23. Wax, free from clay, goes through line 24 to the wax molds, and spent clay is discarded through line 25.

We claim as our invention:

1. The process for producing light colored, high melting wax from dark colored, normally solid paraffin wax of lower melting point, which comprises contacting the wax in the liquid state with concentrated sulfuric acid at an elevated temperature of the order of 140° F., in the presence of a thinning diluent capable of dissolving said dark-colored paraffin wax and substantially resistant to the action of concentrated sulfuric acid under the conditions of the treatment, removing the resulting sludge from the wax-diluent solution, chilling the sour substantially sludge-free wax-diluent solution to solidify only a portion of the wax, and separating the solidified wax from the liquid wax-diluent solution without additional acid.

2. The process for producing light colored, high melting wax from dark colored, normally solid paraffin wax of lower melting point which comprises contacting the wax in the liquid state with concentrated sulfuric acid at an elevated temperature of the order of 140° F. in the presence of a low-boiling paraffinic diluent which is substantially resistant to the action of strong sulfuric acid under the conditions of the treatment, removing the resulting sludge from the wax-diluent solution, chilling the sour substantially sludge-free wax-diluent solution to solidify only a portion of the wax, and separating the solidified wax from the liquid wax-diluent solution without additional acid.

3. The process for producing light colored, high melting wax from dark colored, normally solid paraffin wax of lower melting point, which comprises contacting the wax in the liquid state with concentrated sulfuric acid at an elevated temperature of the order of 140° F., in the presence of a thinning diluent capable of dissolving said dark-colored paraffin wax and substantially resistant to the action of concentrated sulfuric acid under the conditions of the treatment, removing the resulting sludge from the wax-diluent solution, chilling the sour substantially sludge-free wax-diluent solution to solidify only a portion of the wax, and separating the solidified wax from the liquid wax-diluent solution without additional acid.

4. The process for producing light colored, high melting wax from dark colored, normally solid paraffin wax of lower melting point, which comprises contacting the wax in the liquid state with concentrated sulfuric acid at an elevated temperature of the order of 140° F., in the presence of a thinning diluent capable of dissolving said dark-colored paraffin wax and substantially resistant to the action of concentrated sulfuric acid under the conditions of the treatment, removing the resulting sludge from the wax-diluent solution, chilling the sour substantially sludge-free wax-diluent solution to solidify only a portion of the wax, separating the solidified wax from the liquid wax-diluent solution without additional acid, and contacting the separated solidified wax in the liquid state with clay.

5. The process for producing light colored, high melting wax from dark colored, normally solid paraffin wax of lower melting point which comprises contacting the wax in the liquid state with concentrated sulfuric acid at an elevated temperature of the order of 140° F., in the presence of a low-boiling hydrocarbon diluent which is substantially resistant to the action of strong sulfuric acid under the conditions of the treatment, removing the resulting sludge from the wax-diluent solution, adding a small quantity of a pulverized granular material to the sour substantially sludge-free solution, chilling the resulting mixture while maintaining the granular material in suspension, to solidify only a portion of the wax, and separating the solidified wax from the liquid wax-diluent solution without additional acid.

6. The process for producing light colored, high melting wax from dark colored, normally solid paraffin wax of lower melting point which comprises contacting the wax in the liquid state with concentrated sulfuric acid at an elevated temperature of the order of 140° F., in the presence of a low-boiling hydrocarbon diluent which is substantially resistant to the action of strong sulfuric acid under the conditions of the treatment, removing the resulting sludge from the wax-diluent solution, adding a small quantity of pulverized clay to the sour substantially sludge-free solution, chilling the resulting mixture while maintaining the pulverized clay in suspension, to solidify only a portion of the wax, separating the solidified wax from the liquid wax-diluent solution without additional acid, warming the separated solidified wax to melt it, and removing the clay from the molten wax by mechanical means.

7. The process for producing light-colored high-melting wax from dark-colored, normally solid paraffin wax of lower melting point, which comprises contacting the wax in the liquid state with concentrated sulfuric acid, at a temperature of the order of 140° F. in the presence of a thinning diluent capable of dissolving said dark-colored paraffin wax and being substantially resistant to the action of the concentrated sulfuric acid under the conditions of the treatment, removing the resulting sludge from the wax-diluent solution under conditions to produce a sour substantially sludge-free oil having an acidity above .2 milligram KOH per gram of solution, chilling the sour wax-diluent solution to solidify only a portion of the wax, and separating the solidified wax from the liquid wax-diluent solution without additional acid.

8. In the process of producing light-colored, high-melting wax from dark-colored, normally solid paraffin wax of lower melting point, which comprises contacting the wax in the liquid state with concentrated sulfuric acid at a temperature of the order of 140° F. in the presence of a low-boiling hydrocarbon diluent which is substantially resistant to the action of concentrated sulfuric acid under the conditions of the treatment, removing the resulting sludge from the wax-diluent solution, adding between .5 to 5% of pulverized clay to the sour substantially sludge-free solution, chilling the resulting mixture while maintaining the pulverized clay in suspension to solidify only a portion of the wax, and separating the solidified wax from the liquid wax-diluent solution without additional acid.

9. The process of producing light-colored, high-melting wax from dark-colored, normally solid paraffin wax of lower melting point, which comprises contacting one volume of the wax in the liquid state in the presence of 1 to 8 volumes of a thinning diluent capable of dissolving said dark-colored paraffin wax and being substantially resistant to the action of concentrated sulfuric acid under the conditions of the treatment, treating the resulting solution with concentrated sulfuric acid at a temperature of the order of 140° F., removing the resulting sludge from the wax-diluent solution, chilling the sour substantially sludge-free wax-diluent solution to solidify only a portion of the wax and separating the solidified wax from the liquid wax-diluent solution without additional acid.

10. In the process of fractionating dark-colored paraffin wax of low-melting point to produce fractions of lighter colored wax having higher melting points, the steps comprising dissolving the dark-colored wax in a low boiling hydrocarbon solvent which is substantially resistant to the action of concentrated sulfuric acid under the conditions of the treatment, treating the resulting solution with sulfuric acid at a temperature of the order of 140° F. to produce a sludge, removing the sludge under conditions to produce a sour substantially sludge-free oil having an acidity above .2 milligram KOH per gram of solution, chilling said sour oil to effect precipitation only of a portion of the wax, separating said precipitated portion without additional acid and further chilling the remaining solution to a lower temperature to precipitate another portion of the wax.

ALVIN P. ANDERSON.
EDWARD J. JAHN.